United States Patent [19]

St. Germain

[11] Patent Number: 5,651,572
[45] Date of Patent: Jul. 29, 1997

[54] ROUNDSLING CONSTRUCTION

[76] Inventor: Dennis St. Germain, 358 High Ridge Rd., Chadds Ford, Pa. 19317

[21] Appl. No.: 589,451

[22] Filed: Jan. 22, 1996

[51] Int. Cl.$^6$ ..................................................... B66C 1/12
[52] U.S. Cl. ............................... 294/74; 57/201; 57/210; 57/3; 57/21
[58] Field of Search .................... 57/201, 3, 21; 294/74

[56] References Cited

U.S. PATENT DOCUMENTS 4,210,089  7/1980  Lindahl ............................ 112/417
4,850,629  7/1989  St. Germain ........................ 294/74

Primary Examiner—Christopher Raimund
Attorney, Agent, or Firm—Anthony J. McNulty

[57] ABSTRACT

Disclosed is a flexible roundsling construction which comprises a fiber optic signal strand component in a bundle of strands of endless parallel loop lifting core yarn contained inside a tubular protective cover material from which two free ends of the fiber optic strand emerge as means for providing a signal of defective continuity in the sling lifting core.

14 Claims, 3 Drawing Sheets

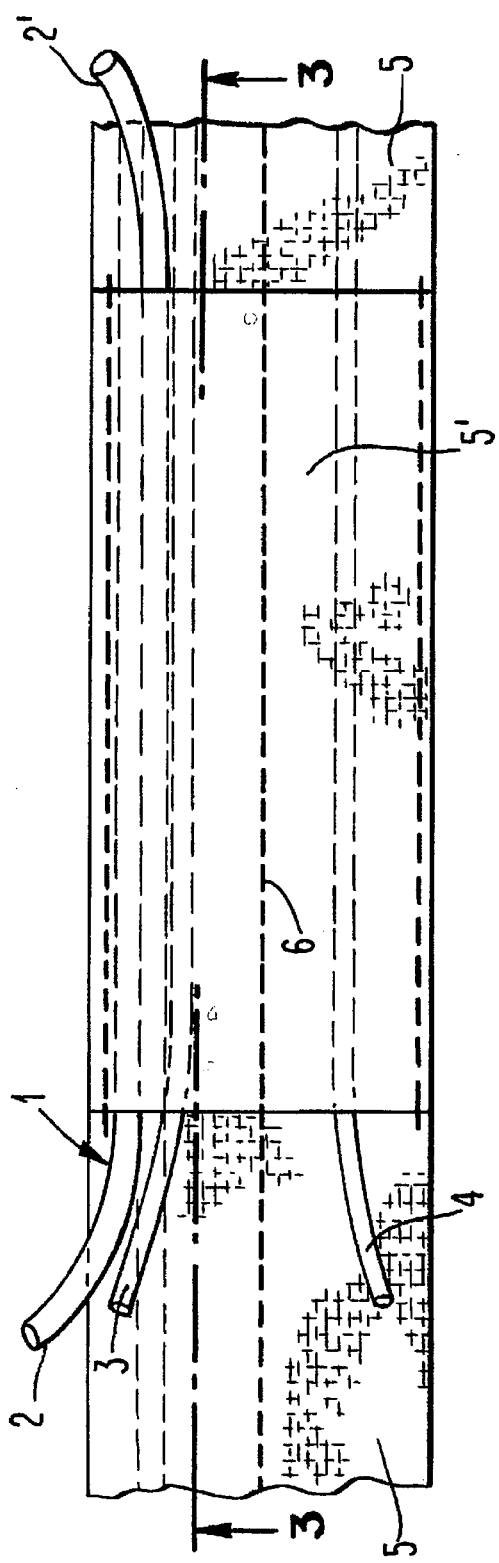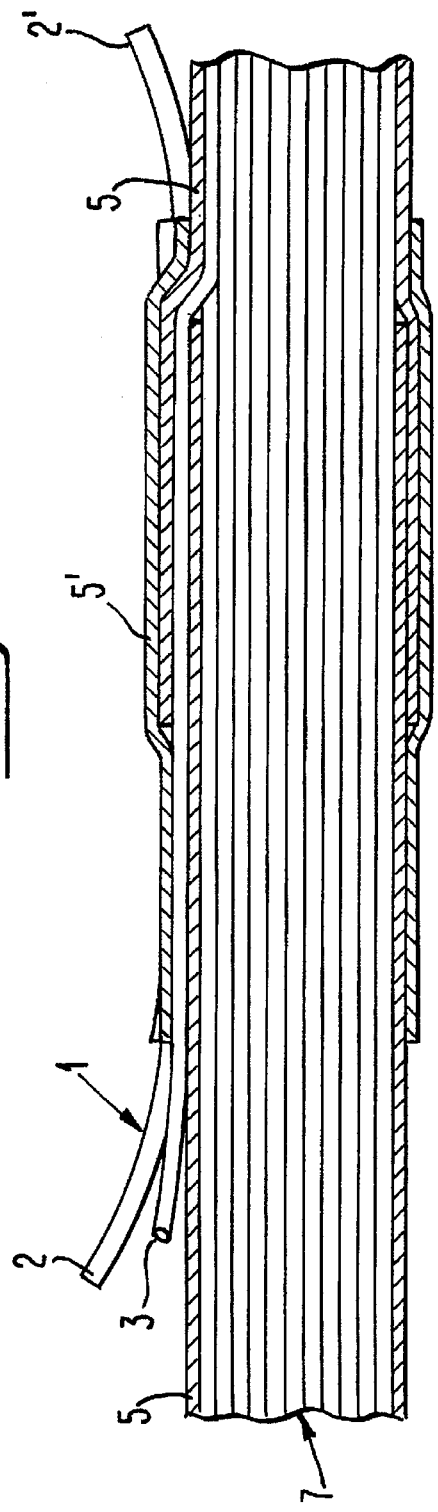

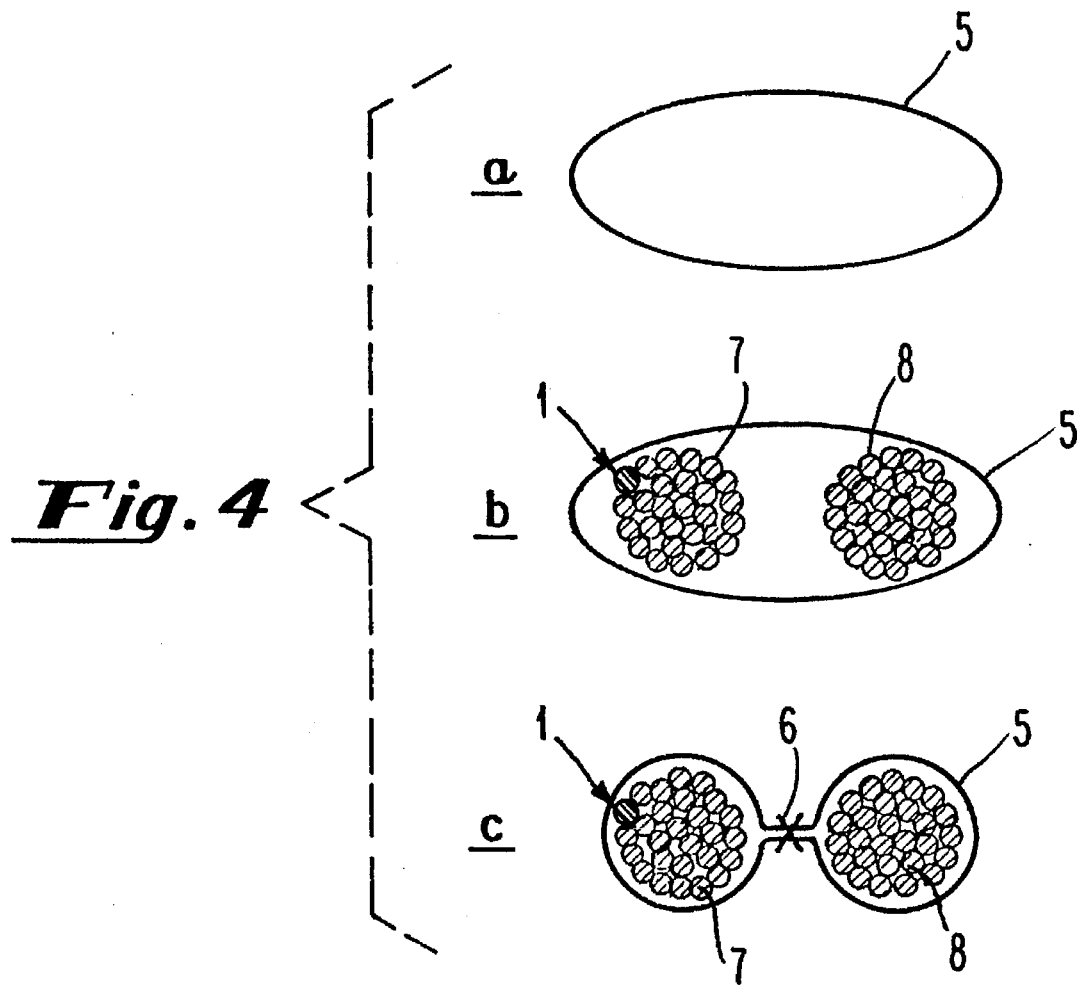
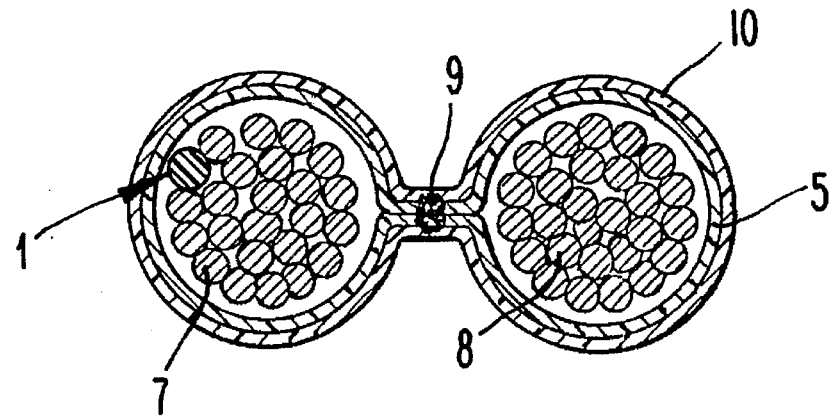

ROUNDSLING CONSTRUCTION

BACKGROUND OF THE INVENTION

History of the Technology

Industrial slings have been improved in flexibility and strength during the past two decades. Stiff metal wire rope slings which were secured by large metal sleeves have been replaced by smaller termination and closure means. The metal strands of wire rope have recently been replaced by synthetic fibers of very high load lifting performance strength which provide lighter, more flexible and even stronger slings than the heavier, inflexible and stiff metal wire rope. Even with such advances in the art of sling making, the riggers who use these improved slings still suffer and endure some of the age old problems of sudden failure and loss of a load caused by a sling breaking suddenly because it was fatigued from being continually subjected to overload conditions.

There are standard break tests for determining how great a load a sling can endure before it is unable to withstand the stress of the test load being applied to it and it breaks. Such break tests have enabled manufacturers of industrial slings to rate the load-bearing capacity of the sling. Most sling manufacturers will affix some type of tag notice on the sling which states the load capacity (rated capacity) of the particular sling. This rated capacity gives the maximum amount of load to which the sling may be subjected and still be considered a safe use of the sling.

Unfortunately, even conscientious riggers who do not take unsafe shortcuts and who operate in a safe responsible manner sometimes are surprised by a sling breaking in use even when they believed it was being used within the load limits of its rated capacity. For example, when industrial slings are in continuous heavy use over three shifts around the clock, the workers on a later shift may not be aware that someone on an earlier shift had subjected the sling to a substantial overload which may have caused serious damage to the lifting core yarn material of the sling. When a synthetic fiber sling is overloaded beyond its tensile strength or weight lifting capacity at maximum stretch, it may never return to its normal strength and load bearing capacity. It may be susceptible to fracture at a stress point. This condition is similar to the stretching of a rubber band beyond its point of normal elasticity so that when the load or tension is removed or relieved, the rubber band may never regain its normal configuration and its strand dimensions may be permanently stretched and may cause it to fail under load which is less than its tensile strength load.

An industrial sling when subjected to overload conditions above its rated capacity can be permanently stretched if the load extends the fibers of the load bearing core material beyond their yield point. Once the load lifting fiber of the sling is stretched beyond its yield point, it actually can change in its physical structure and be restricted at a stress point. To date there has been no way for a rigger to determine if a sling with a protective cover was subjected to an overload condition and may have been fatigued or even structurally changed to the point where it is unsafe and can no longer lift a load according to the maximum limits of its rated load capacity. Thousands of roundslings are being used on a daily basis in a broad variety of heavy load lifting applications which range from ordinary construction, plant and equipment operations, to oil rigs, nuclear power plants and suchlike. The lifting core fibers of such roundslings may be derived from natural or synthetic materials, such as polyester, polyethylene, nylon, and suchlike. These core fibers are also susceptible to damage from abrasion, cutting by sharp edges, or degradation from exposure to heat corrosive chemicals or gaseous materials, or other environmental pollutants.

In certain instances, the core yarn could melt or disintegrate when subjected to elevated temperatures or chemicals. Still another safety concern flows from abuse by the user when the core yarn is damaged from abrasive wear when the slings are not rotated and the same wear points are permitted to stay in contact with the device used for lifting, such as hooks on a crane, and on the load itself for extended periods of time. Such abrasion is accelerated for certain types of synthetic fiber material and especially if the load contact section is under compression or bunched. Riggers in the field are concerned that the lifting core yarn of their roundslings may be damaged on the inside without their being able to detect such defects through the sling cover.

The structural integrity of the roundsling lifting core material is difficult to determine when it is hidden inside a protective cover of opaque material which renders the lifting core yarn inaccessible for inspection. A defective roundsling could fail suddenly without warning to the user and cause loss of lives and property. It is the duty of responsible industry to provide safe slings to its riggers to avoid bodily injury, property damage and product liability claims.

Discussion of the Prior Art

In other fields, there are certain devices, such as circuit continuity testers, which detect and warn of imminent failure in cordage through the change of a warning element from one condition to another condition based on a predetermined status of the cordage; see McKeen, et al. U.S. Pat. No. 4,992,778, Schmidt U.S. Pat. No. 2,6901,698, Devereaux U.S. Pat. No. 4,132,987; and Ransom U.S. Pat. No. 3,938,126. The following prior art disclosures are representative of the status of roundsling technology: St.Germain U.S. Pat. No. 4,850,629 and Lindahl U.S. Pat. No. 4,210,089. In the prior art, the terminal end of the load bearing strand material would ordinarily be fastened to another end of a strand of the same material and the entire inner core of load bearing material would be hidden inside the cover material. The prior art slings would have terminated all of the load bearing strand members so that no strands would appear in a free extension apart from the body formed by the other strands regardless if there were a cover material over the load bearing core material or not.

There is little or no teaching in the prior art concerning a roundsling construction which comprises a pre-failure warning indicator.

SUMMARY OF THE INVENTION

The roundsling construction of this invention comprises a fiber optic "signal" means, which is in the form of a fiber optic strand which is an integral member of the lifting or load-bearing core yarn which is configured in endless parallel loops of strands contained inside a protective cover material, said cover having openings or orifice slits out of which said optic signal strands emerge from said core for a distance of about one inch or more. Aforesaid signal strands appear outside the sling cover in a free extension therefrom. The load lifting core yarn may be a filament fiber selected from polyester, polyethylene, DACRON®, a synthetic polyester polymer material manufactured by the owner of the mark, the DuPont Company, KEVLAR®, a synthetic aramid polymer material manufactured by the owner of the mark, the DuPont Company, SPECTRA®, a synthetic high density polyethylene polymer material manufactured by the owner of the mark, Allied Fibers, a Division of Allied Corporation. The fiber optic strand material may be constructed from polyethylene or other material compatible with the core yarn.

The optical signal strand member conducts light from a light source for testing the integrity and the continuity of the core strands. If the fiber optic member of the sling core yarn has a break, then the second end of the fiber optic strand will not show the transmission of light through the core yarn when a light energy transmitter is applied to the first end of the fiber optic strand. Fiber optic materials are capable of transmitting light into endless parallel relationship with the fibers of lifting core yarn. This roundsling comprises within its core yarn certain fiber or rod material which permits the propagation of light that enters the fiber material at one end and is totally reflected back inward from the fiber wall through the entire length of the fiber optic strand which enables the light being transmitted within the thread to pass from one end to the other. The inclusion of the fiber optic material in the lifting core yarn of the roundsling converts the inaccessible inner core area into an observable test check area by means of the passage of light through the fiber optic component of the lifting core. No matter how the roundsling of this invention is distorted or shaped under load during use, it still is susceptible to the propagation of light through its fiber optic member from a first end to a second end.

The fiber optic signal member of the lifting core of the roundsling of this invention tends to develop similar wear characteristics as the lifting core fiber materials. If the fibers of lifting core yarn fracture or break, then the fiber optic material will also be damaged which will break the transmission of light so that light will not pass to the other end of the emerging signal strand.

The fiber optic component of the roundsling may be formed from plastic filaments such as polyethylene, and spun to any suitable diameter which may vary from 5 to 100 microns up to more than an inch and packed into bundles of tens or hundreds or more or less depending on the application for the particular roundsling. Such bundles of fiber optic material may be brought together in a single array and fabricated as thread, rods, ribbons or sheets. These bundles are as flexible as the individual fiber and can be twisted and bent to conduct light and images around corners. Light is transmitted by repeated internal reflections through the lifting core yarn even though the sling is curved in a round configuration and even though it's covered by an opaque cover material. The light admitted into one end of the lifting core yarn enters the fiber optic component and is transmitted along it without loss by thousands of successive internal reflections. If the light emerges at the other end of the signal fiber, it indicates the integrity of this fiber throughout the path of the roundsling lifting core bundle. This sling construction enables the user to test it by shinning a light in one end of the sling to determine if it can be seen at the other end of the signal fiber. If the light fails to pass from one end of the signal fiber optic to the other end, then the user is warned that the lifting core bundle may be damaged, and to remove the protective cover from the roundsling for further inspection, or to discard the roundsling, remove it from use and repair it, or replace it.

A preferred embodiment of this invention is a roundsling construction comprised of a high performance fiber, such as Kevlar® Aramid fiber, or SPECTRA® fiber as a component of the lifting sling core yarn in integral relationship with fiber optic material therein. Such sling constructions have high lifting and break strength, lighter weight, high temperature resistance and high durability. Further, two or more optic signal strands may be used so that they emerge from multiple openings in the cover; at least one signal strand member will have each of its ends emerge in opposite directions from the sling cover and extend at least from one inch to about six inches from its point of emergence from the cover, or other containment means, such as a tag, or sleeve for overlapping the lifting core fiber strands.

Still another preferred embodiment of this invention is to extend other strands of load bearing core yarn so they emerge in free extension apart from the sling body so that the sling comprises free extensions of strands of signal fiber optic member and free extensions of strands of lifting core yarn. This embodiment provides an extra indicator for detecting sling overload when it is subjected to a load which exceeds its tensile strength or rated capacity. When this happens, the extended core yarn strand which emerges out of the cover material will shorten in free extension length and alert the rigger to the sling overload condition. At overload condition, the core yarn is being stretched toward the direction of the load point. The terminal end of the extended strand of the load bearing core yarn will also move toward the direction of the overload point when the sling is in direct contact with the load being lifted or pulled or held or lowered. The free extensions of the core yarn will not move from their initial rest position so long as the sling is not used beyond its rated capacity; these signal members will stay in the same distance of lineal extension away from the point of their emergence from the opening cut in the outer cover material of the sling.

In an alternate embodiment, a different fiber material, which stretches more than the majority material component of the core yarn, is incorporated into the core yarn to form a composite of mixed core material, the minority free extension of which has a greater capacity for movement towards the overload point and moves in a more responsive manner and travels a greater distance back toward the opening of the outer cover material for which it emerges. Still further the fiber optic signal strand may be fastened to a free emerging lifting core yarn strand so that the two strands would be drawn together toward the cover opening when the sling is overloaded.

Under certain conditions of sling overload, the free extension signal strand will completely disappear from view and re-enter the inside of the outer cover material through the same opening in the cover from which it initially emerged. In other overload conditions, the signal member will merely move closer to the point of the opening in the cover which was the point of its initial emergence. In either event, the rigger is warned of the happening of a sling overload condition. In certain instances, when the sling comprises multiple path load lifting core components, two or more free extension signal members may be used to warn of a sling overload condition.

BRIEF DESCRIPTION OF THE DRAWINGS

FIG. 2. is a direct plane view of the endless loop roundsling of FIG. 1.

FIG. 3. is a cross-section view along the line 3—3 of the endless loop roundsling of FIG. 2. which shows a free end of fiber optic strand which separates from the inner core and extends through the sling cover.

FIG. 4. is a cross-section view of an endless loop roundsling having twin bundles of inner lifting core of load bearing strand material inside a single endless tubular protective cover in which at least one lifting core bundle comprises at least one fiber optic strand.

FIG. 5. is a cross-section view of an endless loop roundsling which is similar to the sling of FIG. 4. which shows a means for fastening and separating said inner core strand material between two separate outer covers.

DETAILED DESCRIPTION

Figure 1:
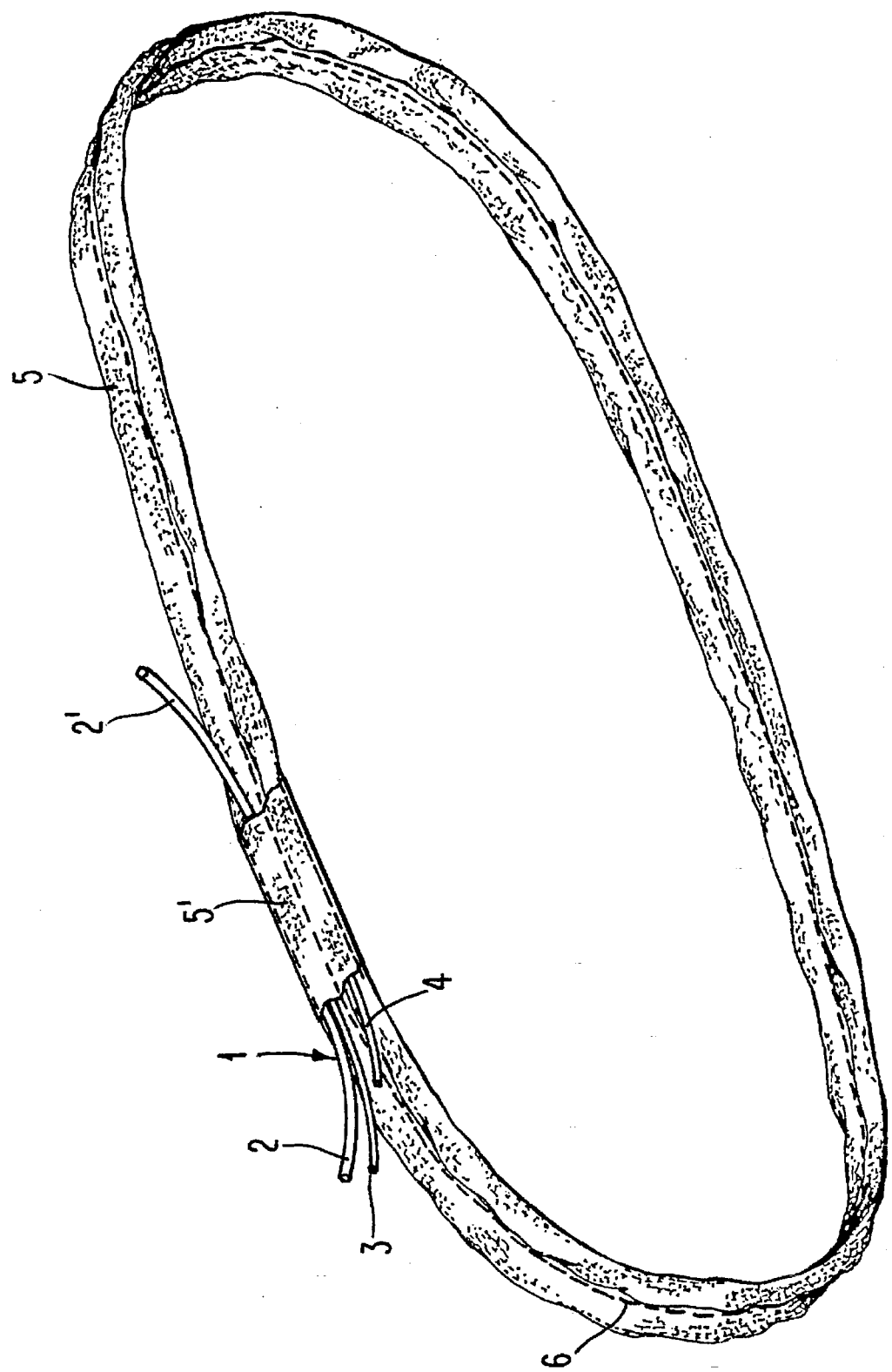
FIG. 1. is an overhead perspective view of an endless loop twin-path roundsling having an inner lifting core of load bearing strands and an outer protective cover which shows two free ends (numerals 2 and $2^1$) of a fiber optic strand (numeral 1) which extend out from the inner core through the sling cover, and also two free ends (tell tails) of a load bearing strand (numerals 3 and 4) which extend through said sling cover.

The fiber optic signal strand is identified as numeral 1 in FIGS. 1 through 5; it may be used in a single path roundsling, or in a multiple path roundsling. The drawings herein illustrate a multiple path roundsling construction. The two free ends (2 and $2^1$) of the fiber optic strand come out of the core bundle (numeral 7 in FIG. 4) and emerge through the protective cover (numeral 5 in FIG. 2) and extend outside of the cover for a distance of one inch or more. The lifting core strands are identified by numerals 7 and 8 in FIGS. 4 and 5. The protective cover is shown as a single envelope in numeral 5 of FIG. 4, and as part of a double protective envelope in numerals 10 and 5 in FIG. 5. The protective cover may be fastened to form separate paths by stitching it longitudinally along its center between the two separated cores using stitching means as exemplified by numeral 6 in FIGS. 1, 2 and 4, and by using glue or hot melt adhesive as depicted by numeral 9 in FIG. 5.

If desired a sling cover reinforcement and information patch, which is shown as numeral $5^1$ in FIGS. 2 and 3, may be used as a tag on which sling capacity information, and suchlike may be communicated to the end user. The fiber optic strand component of the inner core is depicted as numeral 1 in all the drawings; the two free ends of the fiber optic signal means strand are depicted as numerals 2 and $2^1$ in FIGS. 1, 2 and 3. The two free ends of load lifting strands (tell-tails) are depicted as numerals 3 and 4 in FIGS. 1 and 2; an entire bundle of lifting strands which form a loop core are depicted collectively as numerals 7 and 8 in FIGS. 3, 4, and 5.

The free ends (2 and $2^1$) of the fiber optic strand continuity damage signal, and the tell-tail free ends (3 and 4) of the load lifting strands are pulled through openings in the sling cover 5, as shown in FIGS. 2 and 3, so that they extend outside the cover for an inch or more. The roundsling construction of this invention is formed from loops of strands of load bearing material as described above which are bundled together in parallel endless loops to form a load lifting core, and a loop of fiber optic strand material having two free ends is incorporated in the endless loop lifting core; all of the loops are aligned in parallel relation to each other; the loops are then placed in such parallel relationship to each other on a surface which has guide means mounted on the surface; the loops are then fastened at their distal ends to a holding means; means for pulling an endless tubular cover having two ends are engaged to pull the cover over one end of said guide means to completely envelop the core bundle of endless loops; the distal ends of the bundle of load core loops are fastened by suitable fastening means; suitable separating means are used to separate the free distal ends of the fiber optic strand from the bundle of lifting core loops; suitable fastening means are used to fasten the distal ends of the tubular cover to form it into an endless loop; suitable cutting means are used to cut an opening or aperture in the cover; and suitable pulling means are used to pull the two free distal ends of the fiber optic signal strand through the aperture in the cover for a distance of one inch or more. A strand of lifting core material may also be separated from the bundle of endless loops and converted into a strand having two free ends which are pulled outside the protective cover to serve as tell-tail overload signal means.

Various sling constructions can make use of the signal means disclosed herein to detect overload and core yarn damage. A skilled artisan will be able to construct slings which may not be specifically described herein yet still remain within the scope of the following claims which define this invention.

What is claimed is:

1. A roundsling which comprises a lifting core in the form of endless parallel loops of load bearing strand material, a strand of fiber optic material having two free ends inside said lifting core, (all said core strands being in parallel endless loop relation to each other endless loop,) tubular cover means for covering all said core strands, said cover having at least one aperture from which said free ends of fiber optic (strand extend.) material emerge from said core and extend for a distance of one inch or more.

2. The roundsling of claim 1 in which two free ends of load bearing strand extend through said cover.

3. The roundsling of claim 1 in which said lifting core comprises a mixture of different load bearing strand materials.

4. The roundsling of claim 1 in which said lifting core comprises (Kevlar®) aramid material strands.

5. The roundsling of claim 1 in which said lifting core comprises (Spectra®) high density polyethylene strands.

6. The roundsling of claim 1 in which said lifting core comprises polyester strands.

7. The roundsling of claim 1 in which said lifting core comprises polyethylene strands.

8. The roundsling of claim 1 in which said lifting core comprises signal means for detecting overload of sling lifting core capacity.

9. The roundsling of claim 1 in which said lifting core comprises signal means for detecting a defect in the continuity of the strand material in the sling lifting core.

10. A roundsling which comprises at least two parallel lifting cores of endless loops of strands of load bearing material, each core separated from the other by endless loop tubular cover means, each said core containing a strand of fiber optic material having two free ends, said cover enveloping all of said core strands, said cover having at least one aperture for each said lifting core from which said free ends of fiber optic (strand extend.) material emerge from said core and extend for a distance of one inch or more.

11. The roundsling of claim 10 in which at least two free ends of load bearing strand extend through said cover.

12. The roundsling claim 10 in which said lifting core comprises a mixture of different load bearing strand materials.

13. A method of constructing a roundsling which comprises first, forming an endless loop of strands of load bearing material to form a lifting core; second, forming loops of at least one strand of fiber optic material having two free ends inside said lifting core, aligning all loops of said strands of material in parallel relation to each other, placing said strands of lifting core loops and fiber optic loops in parallel relationship on a surface having guide means mounted on said surface, fastening said loops at their distal ends to a holding means, separating said two free distal ends of said fiber optic strand from said holding means, pulling a tubular cover means having two ends over one end of said guide means to envelop said endless loops, (fastening the distal ends of said parallel load bearing endless loops,) separating the two free distal ends of said fiber optic strand, fastening the distal ends of said tubular cover means to form an endless loop, cutting an aperture in said cover means, and applying pulling means to said two distal free ends of said fiber optic strand to draw said free ends out through said aperture in said cover means for a distance of one inch or more.

14. The method of claim 13 which includes forming two free distal ends of at least one load bearing strand of lifting core material by separating said strand from said endless loop holding means, and applying pulling means to said two distal free ends of said load bearing strand to draw said free ends out through said aperture in said cover means for a distance of one inch or more.

* * * * *